United States Patent [19]

MacKay

[11] 4,240,617

[45] Dec. 23, 1980

[54] ULTRA LOW VOLUME PROCESSING OF AND CARTRIDGE FOR PHOTOGRAPHIC FIXER SOLUTION TO RECOVER SILVER THEREFROM

[75] Inventor: Michael T. MacKay, Sandy, Utah

[73] Assignee: B. R. MacKay & Sons. Inc., Salt Lake City, Utah

[21] Appl. No.: 88,257

[22] Filed: Oct. 25, 1979

[51] Int. Cl.$^3$ .............................................. C22B 11/04
[52] U.S. Cl. ..................................... 266/170; 75/109; 75/118 P; 266/101
[58] Field of Search .................. 266/170, 101; 75/109, 75/118 R, 118 P

[56] References Cited

U.S. PATENT DOCUMENTS

| | | | |
|---|---|---|---|
| 3,369,801 | 2/1968 | Hartman | 26/170 |
| 3,630,505 | 12/1971 | MacKay | 75/109 X |
| 3,655,175 | 4/1972 | Zeleny et al. | 266/170 |
| 3,744,995 | 7/1973 | MacKay | 75/109 |
| 3,792,845 | 2/1974 | Larson | 266/170 |
| 3,840,217 | 10/1974 | MacKay | 75/109 X |

Primary Examiner—G. Ozaki
Attorney, Agent, or Firm—Lynn G. Foster

[57] ABSTRACT

A small tubular cartridge for processing of ultra low volumes of gravity flow spent photographic fixer solution to recover residual silver therefrom. The tube cartridge comprises a hollow transparent or light transmitting flexible plastic tube of synthetic resinous material such as vinyl. The transparent tube is closed by an impervious bottom end cap which is bonded or otherwise integrally secured to the lower end of the transparent tube, with a top end cap being similarly secured to the top end of the tube and providing a central axial solution outlet opening and an eccentric solution inlet opening, each opening having a downwardly directed collar. A central solution exit tube is disposed substantially coextensive and coaxially with the transparent tube and is integrally secured as by bonding at its upper end to the central axial effluent solution opening. The axial solution exit tube has a lower bevelled end to insure that fixer solution is readily received therein and discharged from the cartridge after it has been processed. A slender coil of iron window screen having a central axial hollow passageway and an outer cylindrical surface is disposed coextensive and coaxially with the transparent tube. One axially directed free edge of the coil is unsecured at the inside axial hollow passageway and a second edge at the outside of the coil is secured against displacement by a plurality of spaced staples. The bottom of the screen is closed by a force-fit end cap which is impervious, while the top is closed by a force-fit end cap which has a central opening the diameter of which is slightly less than the diameter of the solution exit conduit. One or more spacers may be provided between the top end cap and the collar of the central axial outlet opening in the top end cap of the transparent tube to insure that the lower bevel end of the solution exit tube is sufficiently elevated above the bottom of the coil of screen to accommodate unrestricted flow into the solution exit tube even after sludge accommodates in the bottom of the tube cartridge.

9 Claims, 2 Drawing Figures

ULTRA LOW VOLUME PROCESSING OF AND CARTRIDGE FOR PHOTOGRAPHIC FIXER SOLUTION TO RECOVER SILVER THEREFROM

BACKGROUND

1. Field of Invention

This invention relates generally to silver recovery and more particularly to ultra low volume processing of and a tube cartridge for photographic fixer solution to recover silver therefrom.

2. Prior Art

Various silver salts used in photographic paper and film when fixed by various fixatives produce a complex silver salt which is dissolved or suspended in solution. As the fixatives become depleted, it is necessary that they be replaced to keep the fixing solution at a satisfactory strength if uniform and acceptable results are to be obtained in film development. This replenishment is often accomplished on a continuing basis by the addition of a given volume of concentrated solution of fixatives to the fixing bath, while at the same time an equivalent volume of spent solution is withdrawn. A method and apparatus, in the form of a bucket for recovering silver from such spent solutions was earlier developed. See U.S. Pat. Nos. 3,630,505; 3,692,291; 3,744,995 and 3,840,217. The indicated apparatus and method is per se inapplicable to ultra low volume processing of the indicated photographic fixer solutions in the range of about 10 gallons per month to two gallons per day. Heretofore, spent photographic solution used at the indicated ultra low rates was merely discarded as waste.

BRIEF SUMMARY AND OBJECTS OF THE INVENTION

The mentioned disadvantage of the prior art silver recovery units for ultra low volume flows have been substantially alleviated by the present invention which novelly and unobviously applies the coil screen principles to solve the ultra low solution flow problems. A tube cartridge is provided comprising a relatively small diameter transparent or light transmitting elongated flexible plastic tube of unifrom inside and outside diameter which is entirely closed by a bottom end cap of rigid non-light transmitting synthetic resinous material lapped upon and bonded to the lower end of the transparent tube. Eccentric longitudinally directed centering studs are provided along the inside of the bottom end cap. By causing the bottom end cap to have a flat horizontal surface, the relatively small cartridge may be caused to rest in an erect position upon a table, desk or the like.

The top end of the transparent tube is closed by a top end cap which is lapped upon and integrally secured to the top end of the transparent tube. The top end cap of the transparent tube provides a central axial opening accommodating displacement of effluent solution from the cartridge and a second eccentric opening by which the fixer solution is initially introduced into the cartridge. Each of the mentioned openings has a downwardly extending collar to appropriately channel the flow of the solution within the cartridge. Inlet and outlet tubes of a conduit assembly are respectively press fit into the two openings of the top end cap whereby flow is appropriately introduced and discharged from the cartridge without leakage, such flow being short circuited in the event of overflow conditions, without harmful effects.

An axial solution exit conduit is integrally joined to the collar of the axial outlet opening in the top end cap and is preferably of non-light transmitting rigid synthetic resinous material. The diameter of the solution exit tube is such as to accommodate downward flow adjacent the exterior surface thereof within the coil of screen and upward flow within the tube. A relatively small coil of screen comprising a series of superimposed screen layers is disposed centrally within the cartridge, the coil having an outside diameter substantially less than the inside diameter of the flexible transparent tube and an inside diameter substantially greater than the outside diameter of the solution exit tube. The coil of screen comprises a free edge at the inside hollow thereof and a free edge along the outside diameter thereof. The free edge at the outside diameter is secured by fasteners to the remainder of the screen to maintain the cylindrical shape and diameter of the coil. The bottom end of the coil of screen is closed by a force-fit end cap which is impervious while the top is likewise contained within a top end cap which is force-fit thereupon but provides a central opening through which the solution exit tube is force-fit into solution tight contiguous relation. One or more spacers may be provided between the top end cap of the screen and the downward central collar of the top end cap of the transparent tube to insure unrestricted entry of processed solution into the solution exit tube at the hollow interior of the screen notwithstanding accumulation of sludge.

A wall mounting bracket or clamp is provided which is mounted by fasteners to a vertical wall or the like at a central site having a reduced thickness. The bracket is C-shaped and surrounds somewhat more than 180 degrees of the exterior surface of the transparent tube, when the cartridge is fully assembled and mounted. The at rest diameter of the C is slightly less than the outside diameter of the transparent tube to insure that adequate clamping force is exerted upon the cartridge to securely hold it in a vertically erect disposition during use. However, the cartridge may be manually force removed from the "memory" clamp for replacement and processing of a used cartridge. Also, the cartridge may be manually caused to be adjusted vertically upward or downward within the wall mounting bracket to properly relate the conduit assembly to other conduit structure by which the fixer solution is introduced into the conduit assembly and discharged therefrom. silicone sealant is preferably used at all force-fit sites to prevent solution leakage.

In view of the foregoing, it is a primary object of the present invention to provide a tube cartridge for processing ultra low volumes of photographic fixer solutions therethrough to recover silver.

It is a further important object according to the present invention to provide for a wall mounted tube cartridge for recovery of silver from ultra low volume flows of photographic fixer solutions and wherein the cartridge may be totally disposed of after use and removal of silver-containing sludge.

It is a significant object to provide a silver recovery tube cartridge having one or more of the following features: is small and compact; uses minimum or negligible space, preferably no floor space; adapts coil screen technology to processing of ultra low volumes of spent photographic solution; is completely disposable after one use; is economical and efficient for ultra low solution flow rates; provides for facile non-technical installation, removal and replacement; which can be used alone or in tandem; and provides for accurate flow displacement therein.

These and other objects and features of the present invention will become more fully apparent from the following description and appended claims taken in conjunction with the accompanying drawings.

DETAILED DESCRIPTION OF THE ILLUSTRATED EMBODIMENT

Figure 1:
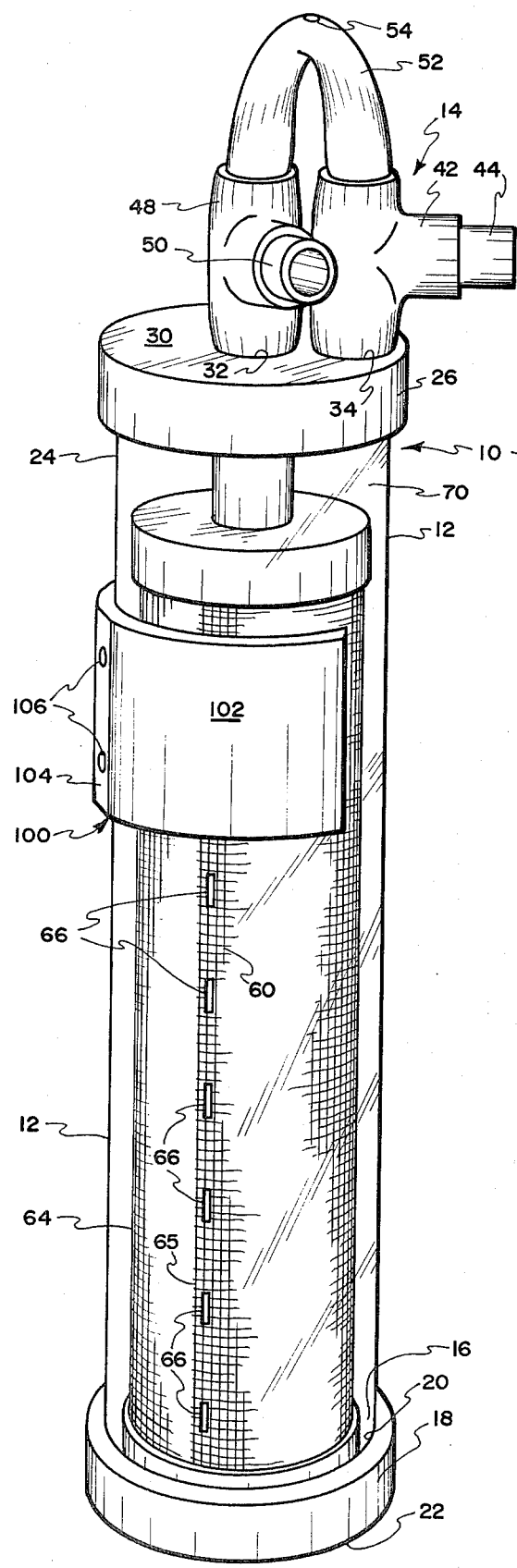
FIG. 1 is a perspective view of the presently preferred tubular embodiment of the present invention.

Reference is now made to the drawings wherein like numerals are used to designate like parts throughout and which illustrate a tube cartridge, generally designated 10, into which ultra low volumes of spent photographic fixer solutions are processed for recovery of the silver content thereof. The illustrated unit is effective to process on a continuous or intermittent basis as little as on the order of ten gallons per month and up to on the order of two gallons per day. The silver recovery tube cartridge 10 comprises a hollow cylindrical transparent or light transmitting elongated plastic tube 12 having a uniform inside and outside diameter. The transparent tube 12 is preferably flexible and may be formed of a suitable synthetic resinous material such as plasticized vinyl. Utilization of a flexible tube in the form of transparent tube 12 accommodates manual squeezing to remove solution from the top conduit assembly or circulating head, generally designated 14, in a manner hereinafter more fully described.

The bottom end 16 of the tube 12 is imperviously closed and sealed by a bottom end cap 18, preferably of rigid non-light transmitting synthetic resinous material snugly lapped upon and bonded or otherwise suitably fastened to the exterior surface of the tube end 16 so as to be integral therewith and to prohibit passage of solution along the bonded interface 20 therebetween. The bottom 22 of the end cap is preferably horizontally flat to accommodate placement of the tube cartridge 10 in a vertically erect position (as illustrated in the Figures) upon a desk, table or the like. The interior of the bottom end cap 18 comprises a plurality of centering studs 21 (FIG. 2) which are equally radially spaced from the centerline of the tube cartridge 10. Each stud 21 is solid, cylindrical in configuration and of a length less than the outer annular flange. The studs 21 cause a coil of screen 60 to be centered within the tube 12 to insure establishment and maintenance of solution flow regions within the tube cartridge 10.

The upper end 24 of the transparent tube 12 is substantially closed by a top end cap 26. End cap 26 forms an annular sealed lap joint with the top end 24 of the transparent tube 12 at site 28, the indicated two members being integrally secured one to the other at annular site 28 in fluid tight relationship. Preferably, the top end cap 26 is formed of a rigid non-light transmitting synthetic resinous material and has a generally horizontal top surface 30. Top surface 30 is interrupted by a first central axially directed circular solution outlet port 32 and an eccentric circular solution inlet port 34. Each port 32 and 34 comprises a downwardly extending collar 36 and 38, respectively, each being illustrated as substantially axially coextensive with the annular sidewall of the top end cap 26.

The conduit assembly 14 comprises a solution influent tube 40 which is press fit into the top cap opening 34. Preferably silicone sealant is interposed therebetween. Influent tube 40 merges with influent Tee 42 which in turn is connected to a horizontal tube 44 which receives the fixer effluent from a photographic dark room, processor or the like.

Likewise, a solution effluent tube 46 is press fit into the solution discharge port 32, preferably with silicone sealant interposed therebetween. The mentioned sealant prevents solution leakage at the interface. Solution discharge tube 46 merges with a Tee 48 which in turn is connected to a horizontally directed effluent tube 50. The elevation of tube 44 must be at least slightly above the elevation of tube 50 for gravity flow through the tube cartridge 10 to prevail.

A flexible and preferably transparent U-shaped bypass tube 52 bridges between the top openings of the Tees 42 and 48 to provide an overflow capacity whereby, if overflow conditions develop, solution bypasses the cartridge. The U-shaped tube 52 is maintained at atmospheric pressure by an elevated opening 54 disposed in the wall thereof.

A relatively thin and small coil of iron window screen 60 is caused to be disposed coaxially with and substantially coextensive in respect to the axis of the transparent tube 12. See FIG. 2. The coil of screen 60 comprises a length of screen wrapped firmly upon itself through several revolutions to produce a hollow interior of a predetermined diameter at site 62 and an outside cylindrical exterior of a second predetermined diameter at site 64. A free screen edge exists, preferably in an unsecured fashion, at the hollow interior 62. No fasteners are needed to retain the desired inside diameter of the coil 60. A free screen edge 65 at the exterior cylindrical surface 64 is preferably secured against displacement by a series of U-shaped staples 66, as illustrated in FIG. 1. Thus, the outside diameter of the coil 60 remains constant.

The diameter of the exterior cylindrical surface 64 is substantially less than the inside diameter of the transparent tube 12 so that an annular space 68 exists between the tube 12 and the screen coil 60. Thus, influent solution reaching an upper solution chamber 70 via the Tee 44, the tube 40 and the collar 38 is caused to pass by force of gravity downward into contact with the exterior surface 64 of the coiled screen within the annular space 68.

An elongated solution exit conduit 80 of relatively small diameter extends nearly the full length and coaxially with the centerline of the transparent tube 12. Conduit 80 is preferably of rigid non-light transmitting synthetic resinous material and has a lower bevelled end 82 spaced a predetermined short distance above the bottom of the cartridge 10 to avoid clogging due to sludge which accumulates in the cartridge 10. The upper end 84 is telescopically disposed within the collar 36 and is bonded or otherwise secured thereto at annular interface 86 in fluid tight relation. The outside diameter of the conduit 80 is sized so as to be substantially less than the inside diameter of the screen coil 60 at surface 62.

Thus, solution within the outside annular chamber 68 will pass inwardly in a generally radial fashion through the openings in the superimposed layers of screen comprising the coil 60 into an annular solution chamber 90 existing between the outside surface of the conduit 80 and the inside surface 62 of the screen coil 60. During said radial flow, as is known in the art, ferric ions from the screen replace silver ions in the solution, the freed silver ions accumulating in the bottom of the cartridge as a sludge. Processed solution within the interior chamber 90 thereafter migrates under force of gravity downwardly within the chamber 90, through the bevelled end opening at 82 and upwardly through the conduit 80 and thence to discharge (e.g. a floor drain) via collar 36, port 32, tube 46, Tee 48 and conduit 50.

A spacer 92 is loosely superimposed over the conduit 80 and is of such a size as to readily slidably move along the exterior surface of the conduit 80. The length of the spacer 92 is selected so as to locate the bevel end 82 of the tube 80 at an elevation such that flow into the tube from the interior chamber 90 is not restricted and clogging at said bevelled site (due to sludge, etc.) is avoided.

Figure 2:
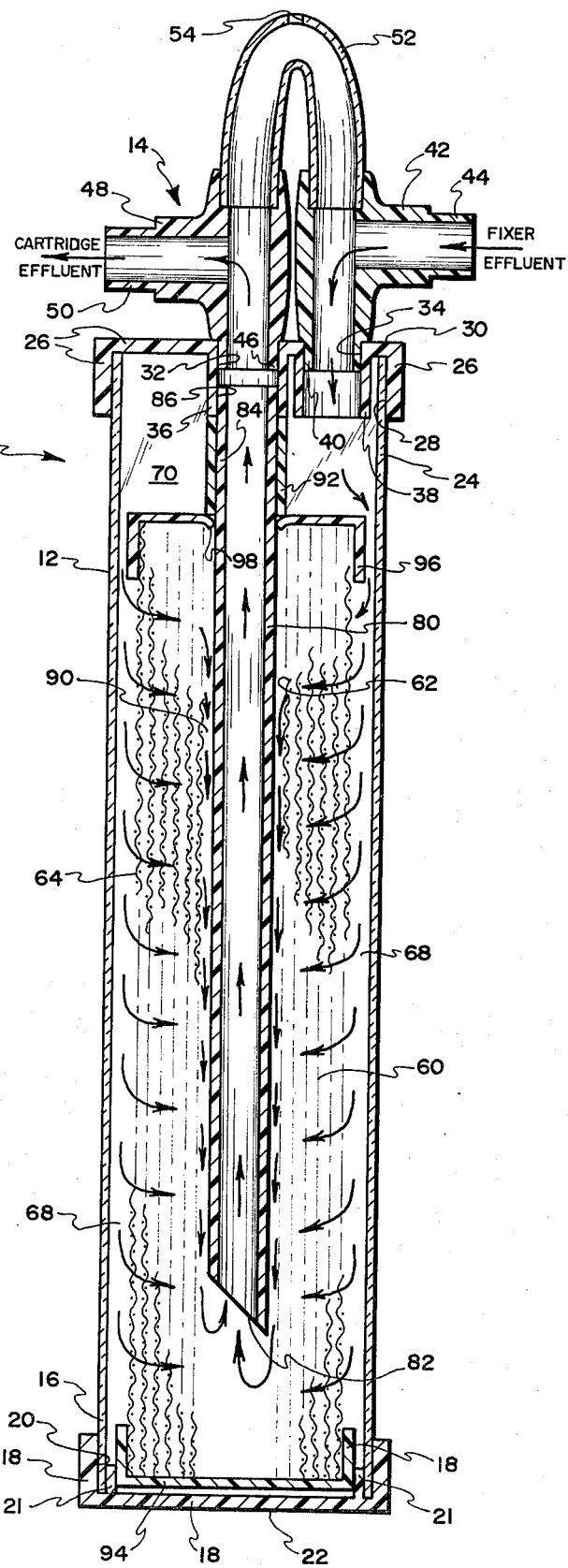
FIG. 2 is a longitudinal cross sectional view of the cartridge of FIG. 1.

The coil of screen 60 is force-fit at its lower end into an impervious flexible lower end cap 94. Likewise, the upper end of the coil of screen 60 is press fit into a top cap 96. Cap 96 comprises a central opening 98 the diameter of which is less than the diameter of the conduit 80. The cap 96 is preferably of yieldable material, such as polyethylene, so that when the conduit 80 is force-fit through the opening 98, as illustrated in FIG. 2, (and silicone sealant or the like is interposed therebetween if desired), a snug fluid-tight interface is created which avoids short circuiting of influent solution to insure that all such solution is fully processed for removal of silver. The described interrelation between the cap 96 and the conduit 80 centers the upper end of the screen coil 60 just as studs 21 center the lower end. Thus, the solution chambers 68 and 90 are initially established and retained.

Cartridge tube 10 also comprises a wall mounting clamp or bracket, generally designated 100. Bracket 100 is of one piece construction, preferably of substantially rigid non-light transmitting synthetic resinous material and comprises first and second jaws 102 which have a combined diameter slightly less than the exterior diameter of the transparent tube 12. The central portion 104 is of reduced thickness so as to form a fulcrum area by which the two jaws 102 may be rotatably forced outwardly counter to the memory of the material from which the clamp 100 is made. The reduced thickness central portion 104 is equipped with two apertures 106 through which screws or the like are caused to pass to secure the clamp 100 to a vertical wall or the like. Thus, after placement on a vertical wall, by forceably spreading the jaws 102 apart the cartridge 10 at tube 12 is inserted therebetween, following which the jaws 102 are released to contiguously and compressively engage the tube 112 thereby securing the tube in a vertically erect position against inadvertent removal or displacement. The vertical orientation of the cartridge may be altered by manually displacing the cartridge up or down in respect to the clamp 100 in order to bring the tubes 44 and 50 of the conduit assembly 14 into alignment with other conduit structure (not shown) for delivering fixer solution to the cartridge 10 and for discharging effluent solution from the cartridge 10.

Once the tube cartridge 10 has been installed in the manner described, ultra low volume flows of spent photographic fixer solution are caused to be processed under force of gravity through the cartridge for an interval of time commensurate with the capacity of the screen coil 60 to provide exchanging ferric ions. The remaining capacity of the cartridge may be visually determined from time to time by observation through the transparent tube 12. Also, the effluent from cartridge 10 may be conventionally tested to determine the silver content for purposes of determining when the capacity of the cartridge has been exhausted.

When the capacity of the cartridge has been exhausted, the transparent tube 12 is manually squeezed to displace residual solution remaining in the conduit assembly 14. The conduit assembly 14 is disconnected from the other conduit structure by which the fixer solution is delivered to and the effluent discharged from the cartridge 10. The conduit assembly 14 is manually separated from the top end cap 26 by manually lifting the conduit assembly 14 from its press fit relation at ports 32 and 34. Ports 32 and 34 are preferably plugged, capped or otherwise suitably closed to avoid leakage in transit.

A new tube cartridge 10 is snapped into place within bracket 100 and the conduit assembly 14 press fit into the proper relationship with the new cartridge. The new cartridge is vertically adjusted to properly align the horizontal tubes 44 and 50 with other conduit structure from which solution is received or to which solution is discharged and the other conduit structure is connected for solution flow.

The removed cartridge is shipped or otherwise delivered to an appropriate sludge refining facility where the plastic tube 12 is severed, the sludge removed from the cartridge for recovery of pure silver using known techniques and the cartridge is discarded.

While the foregoing description has been directed to utilization of a single tube cartridge, it is to be appreciated that such cartridges may be used in tandem or, if desired, one or more such cartridges may be used as a secondary recovery unit for processing fixer solutions discharged from other types of silver recovery apparatus, such as electrolytic silver recovery units.

From the foregoing it is clear that the present invention comprises a novel tube cartridge into which ultra low volumes of spent photographic fixer solution are processed for the recovery of silver therefrom in lieu of the prior practice of wasting such low volumes. The tube cartridge is an improvement upon and a novel and unobvious advance in the art of coil screen silver recovery which is efficient, totally disposable, economical, utilizes minimum space without using up valuable floor area in any one of several out of the way locations, and is easily installed, removed and exchanged or replaced.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tube cartridge for recovery of silver from ultra low flow volumes of used photographic fixer solution comprising:

an elongated narrow light transmitting hollow exterior tube of yieldable synthetic resinous material;

first closure means of synthetic resinous material closing the bottom of the exterior tube in fluid-tight relation, the first closure means comprising coil-centering means exposed adjacent the interior of the exterior tube;

second closure means of synthetic resinous material substantially closing the top of the exterior tube in fluid-tight relation, the second closure means comprising a concentric coil-centering sleeved port by which solution is gravity discharged from the interior sleeve and an eccentric sleeve port by which solution is introduced into the exterior tube;

a small diameter solution exit conduit of synthetic resinous material comprising an integral extension of the concentric sleeved port extending along the centerline of the exterior tube along substantially the full length of the exterior tube to a location a predetermined distance above the first closure means, the lower end of the exit conduit being open to receive solution to be discharged from the exterior tube;

a hollow coil of iron screen concentrically disposed within the exterior tube and having an inside diameter greater than the diameter of the exit tube whereby a first annular flow chamber is defined therebetween and an outside diameter less than the inside diameter of the exterior tube whereby a second annular flow chamber is defined therebetween, the coil resting concentrically upon the first closure means with the top below the second closure means so as to define an influent chamber therebetween the concentricity being established and retained by the coil-centering means;

cap means of yieldable synthetic resinous material force-fit over the top of the coil and having a central opening of a diameter less than the diameter of the exit conduit and through which the exit conduit is force-fit to create a fluid-tight relation;

spacer means within the influent chamber interposed between the second closure means and the coil to establish and retain predetermined distance between the lower end of the exit conduit and the first closure means.

2. A tube cartridge according to claim 1 wherein the exterior tube is of uniform thickness having constant inside and outside diameters.

3. A tube cartridge according to claim 1 wherein the first closure means is cup-shaped and is lapped upon and integrally secured to the lower end of the exterior tube, wherein the first closure means is of rigid non-light transmitting synthetic resinous material and comprises a flat bottom to accommodate placement of the cartridge upon a flat surface in an erect position.

4. A tube cartridge according to claim 1 wherein the second closure means is of rigid non-light transmitting synthetic resinous material and wherein the two ports of the second closure means have means adapted to receive in force-fit relation fluid communicating portions of a conduit assembly by which solution is introduced through and discharged out of the second closure means.

5. A tube cartridge according to claim 1 wherein the lower end of the solution exit conduit comprises a bevelled open end.

6. A tube cartridge according to claim 1 wherein the spacer means comprises a hollow sleeve slidably disposed upon the solution exit conduit.

7. A tube cartridge according to claim 1 wherein the upper end of the solution exit conduit is telescopically contiguous with the concentric coil-centering sleeve port and is integrally secured thereto.

8. A tube cartridge according to claim 1 wherein the hollow coil comprises a longitudinally directed edge exposed at the outside surface thereof and further comprising a plurality of staples firmly stationarily securing said edge to the coil.

9. A tube cartridge according to claim 1 further comprising a yieldable wall mounting clamp of synthetic resinous material adapted to be secured to a vertical wall or the like and comprising open jaw members spanning in excess of 180 arcuate degrees and having a diameter slightly less than the outside diameter of the exterior tube whereby the cartridge at the exterior tube is snapped into and compressively retained within the clamp means, the cartridge upon insertion being vertically adjusted and the cartridge may be manually forced from the clamp means.

* * * * *